United States Patent

[11] 3,550,733

| [72] | Inventor | Johannes Ortheil |
| | | Allee 10, Anrath, Germany |
| [21] | Appl. No. | 768,747 |
| [22] | Filed | Oct. 18, 1968 |
| [45] | Patented | Dec. 29, 1970 |
| [32] | Priority | Oct. 18, 1967 |
| [33] | | Germany |
| [31] | | No. 1,650,091 |

[54] PACKING SYSTEM FOR HYDROPNEUMATIC SHOCK ABSORBERS
1 Claim, 2 Drawing Figs.

[52] U.S. Cl. .................................................. 188/282, 188/88
[51] Int. Cl. ..................................................... F16f 9/36
[50] Field of Search ........................................... 188/88.503, 96.5, 100S; 16/55, 82

[56] References Cited
UNITED STATES PATENTS

| 2,880,022 | 3/1959 | Schultze ...................... (188/100S)UX |
| 3,299,990 | 1/1967 | Ratcliffe ........................ 188/88(.503)X |
| 3,358,318 | 12/1967 | Ingham ......................... 188/88(.503)X |

FOREIGN PATENTS

| 942,959 | 9/1948 | France ........................ 188/100(S) |
| 1,322,034 | 2/1963 | France ........................ 188/100(S) |

Primary Examiner—George E. A. Halvosa
Attorney—Holman, Glascock, Downing and Seebold ABSTRACT: A packing system for a piston and cylinder hydropneumatic shock absorber comprising a high pressure packing between the piston rod and one end of the cylinder. A wedge packing movable between a stop and a conical shoulder is also at said one end of the cylinder. The piston rod passes through the piston, and the piston is slidable upon the piston rod between two stops. Liquid communication bores are spaced between the two stops such that when the piston is abutting one of the stops the communication means is closed, and when the piston abuts the other stop the communication means is open.

INVENTOR
JOHANNES ORTHEIL

BY Glascock, Downing + Seebold
ATTORNEYS

PACKING SYSTEM FOR HYDROPNEUMATIC SHOCK ABSORBERS

BACKGROUND OF THE INVENTION

This invention relates to a packing system for piston rod cylinders of hydropneumatic shock absorbers, especially oleo struts or the like, consisting of piston and piston rod packing.

As is known, the seal requirements of a hydropneumatic oleo strut are high, as escaping leakage oil can be replaced automatically only with the aid of a level regulator. In such cases the leakage oil is sometimes returned to the vessel through additional lines. If there is no level regulation, or if a leakage oil line is to be dispensed with, provision must be made for as good a packing as possible. The packings used until now all have the disadvantage that the pressure on them increases in direct proportion to the pressure in the system. Even though it is possible, despite relatively high pressures, to avoid a major leakage by the use of lip packings for example, there occurs an increased pressing of the packing against the piston or piston rod and, as a result thereof, increased wear.

The problem underlying the invention is to provide a packing system in which the piston rod packing is relieved of the pressure upon rapid inward movements of the piston caused, for example, by runway irregularities.

SUMMARY OF THE INVENTION

The solution of this problem is achieved in that the piston rod packing consists of a high-pressure packing preceded by a wedge packing which is movable relative to the cylinder between a corresponding conical shoulder and a stop. The piston packing and piston are movable relative to the piston rod, between two stops and, in a position reached upon inward movement of the piston rod, closes a connection between a piston zone and an annular zone. Upon outward movement of the piston rod the connection is cleared again and the sliding resistance of the piston on the piston rod is lower than that on the cylinder, while the wedge packing rubs more on the piston rod than on the cylinder.

The advantage of this system resides in that upon greater inward movements of the piston, after the closing of the connection, a vacuum is created in the annular zone, so that the piston rod packing is relieved. This means that the piston rod packing becomes operative only at normal or slightly increased system pressure.

DESCRIPTION OF THE DRAWINGS

In the accompanying drawings an example of the preferred construction is illustrated diagrammatically.

DETAILED DESCRIPTION OF THE INVENTION

Figures 1, 2:
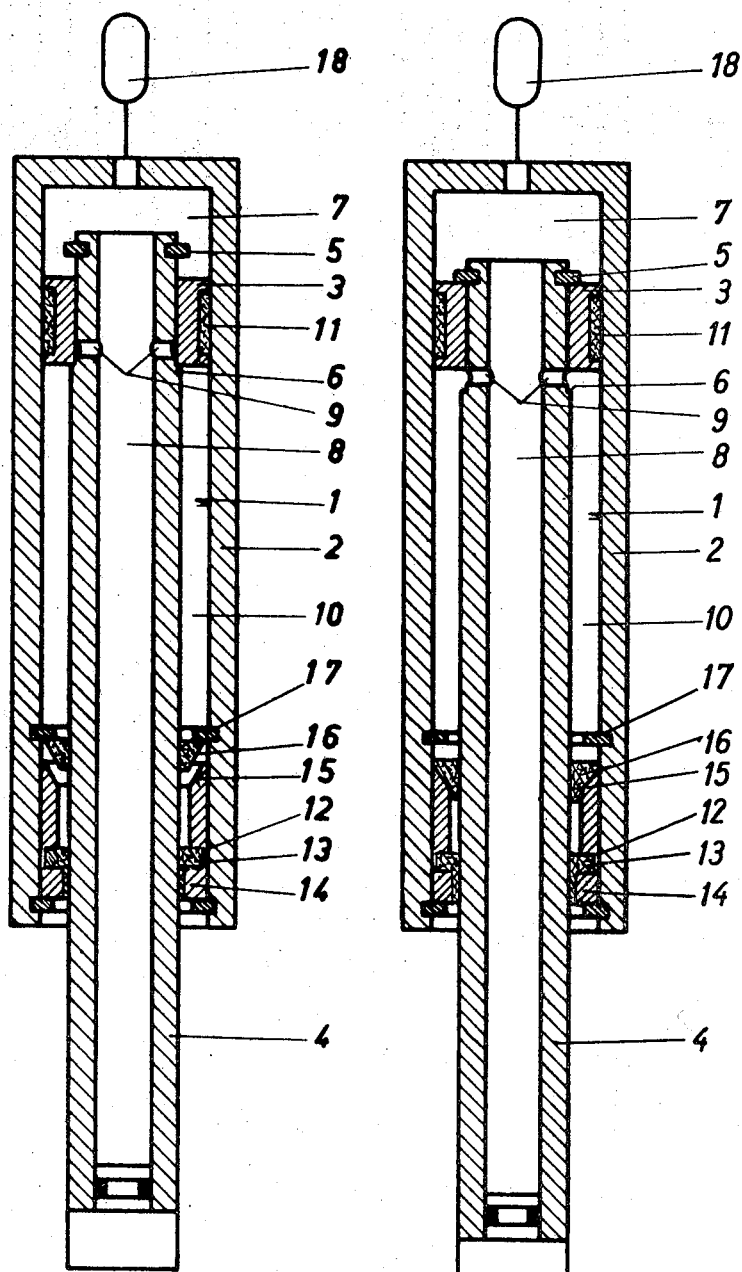
FIG. 1 shows a hydropneumatic oleo strut during inward movement of the piston.
FIG. 2 shows the same oleo strut with the piston moving outward.

In a bore 1 of a cylinder 2 there slides a piston 3 which can move on a piston rod 4 between two stops 5 and 6. The piston rod 4 contains a longitudinal bore 8 which is connected with a piston zone 7 and which can be connected with an annular zone 10 by transverse bores 9, depending on the position of piston 3. On its outer circumference piston 3 carries a packing 11. The annular zone 10 is sealed from the atmosphere by a high-pressure packing 12 which is mounted in a groove 13 of a bushing 14 pressed into bore 1. Bushing 14 is provided with a conical shoulder 15, which serves as a stop for a wedge packing 16. Opposite movement of the wedge packing 16 relative to cylinder 2 is limited by a stop 17 carried by the cylinder. The piston zone 7 is connected with a hydropneumatic pressure reservoir 18.

The operation of the packing system according to the invention is as follows:

Starting from the position shown in FIG. 2, upon an inward movement of the piston rod 4 the piston zone 7 will become smaller. Due to the resulting pressure increase liquid is forced into the pressure reservoir 18. The pressure also travels via bore 8 and transverse bores 9 into the annular zone 10 and thereby presses wedge packing 16 with increased force onto the shoulder 15, whereby good packing is obtained. The high-pressure packing 12 is loaded only by the normal system pressure. Upon displacement of the piston rod 4, the position of piston 3 relative to the cylinder 2 remains substantially unchanged, since due to the packing 11 the friction with cylinder 2 is greater than that on the piston rod 4. This relative movement between piston 3 and piston 4 causes the transverse bores 9 to be closed by piston 3 after a predetermined stroke of piston rod 4. With a further inward movement of the piston rod 4, the pressure in the piston zone 7 continues to increase but cannot penetrate into the annular zone 10. As piston 3 is being taken along by piston rod 4 abutting the stop 6, the annular zone 10 becomes greater and, since no liquid can communicate from the piston zone 7, a vacuum is produced. The wedge packing 16, now relieved, is lifted off its seat, resulting in the position shown in FIG. 1. The high-pressure packing 12 is likewise relieved. When the piston rod 4 moves in an opposite direction, the piston 3 will at first retain its position relative to piston rod 4, as the pressure in the piston zone 7 is much higher than the vacuum in the annular zone 10, and thereby the different frictional forces between piston 3 and cylinder 2, or respectively piston rod 4, do not at first become operative. The wedge packing 16, however, since the pressure on both sides of the wedge packing 16 is about the same, is taken along by the piston rod 4 and abuts against the shoulder 15. Upon further downward movement of the piston rod 4 a point is finally reached where the pressures in the piston zone 7 and in the annular zone 10 are equal. On the basis of the different frictional forces already described, the piston 3 now moves relative to the piston rod 4 up to its stop 5 and clears the transverse bores 9, whereby the position shown in FIG. 2 is reached again. The high-pressure packing 12 is at first exposed only to a low pressure, which may increase to the pressure of the system by leakage oil flowing past the wedge packing 16. However, this pressure is built up in the manner already described as the piston rod 4 moves elastically inward, so that the actual load duration is greatly reduced.

As a modification of the preferred embodiment, the piston may, of course, be firmly connected with the piston rod and the packing itself be displaceably arranged. The form and material of the packings are freely selectable as long as the described requirements with respect to sealing and frictional behavior are fulfilled. Likewise the type of stops may be selected at will. Into the connection of the piston zone and the annular zone check valves, throttle check valves or similar devices may be installed, in order to bring about different flow resistances in different directions.

I claim:

1. A hydropneumatic shock absorber of the type including a cylinder having an open end and a closed end in communication with a source of hydropneumatic pressure, a hollow piston rod within the cylinder and projecting through the open end thereof, said piston rod having upper and lower spaced stops adjacent the inner end thereof, a piston surrounding said piston rod between said upper and lower stops and having a height less than the distance between the stops whereby the piston may have limited axial movement, said piston having an annular packing about its periphery engaging the cylinder, said piston, cylinder and closed end of the cylinder providing a piston zone, a bushing mounted within the cylinder adjacent the lower end thereof and through which said piston rod extends, said bushing being provided with a groove therein intermediate the upper and lower ends thereof, a high-pressure packing positioned in the groove for sealing an annular zone defined by the piston, piston rod and cylinder from the atmosphere, a conical shoulder at the upper end of the bushing, a wedge-shaped packing on the piston rod about the bushing, a stop in the cylinder about said wedge-shaped packing for limiting the upward movement of said packing while the shoulder limits the downward movement thereof, and said piston rod having at least one bore therein adjacent the lower stop, the arrangement being such that the piston moves between the upper and lower stops to open and close said at least one bore and the frictional forces between said annular packing and the cylinder are greater than said piston and piston rod and the frictional forces between the wedge-shaped packing being greater between said wedge-shaped packing and the piston rod than between said wedge-shaped packing and the cylinder.